US009646091B2

(12) United States Patent
Chadha et al.

(10) Patent No.: US 9,646,091 B2
(45) Date of Patent: May 9, 2017

(54) FILE JOINING ON BACK END DEVICE

(71) Applicant: Futurewei Technologies, Inc., Plano, TX (US)

(72) Inventors: Vineet Chadha, San Jose, CA (US); Guangyu Shi, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 454 days.

(21) Appl. No.: 14/188,429

(22) Filed: Feb. 24, 2014

(65) Prior Publication Data

US 2015/0242502 A1   Aug. 27, 2015

(51) Int. Cl.
*G06F 17/30* (2006.01)

(52) U.S. Cl.
CPC .. *G06F 17/30864* (2013.01); *G06F 17/30115* (2013.01); *G06F 17/30194* (2013.01); *G06F 17/30498* (2013.01)

(58) Field of Classification Search
CPC ............. G06F 17/30115; G06F 17/30864
USPC .................................................. 707/827
See application file for complete search history.

(56) References Cited

U.S. PATENT DOCUMENTS

| | | | | |
|---|---|---|---|---|
| 5,151,989 | A * | 9/1992 | Johnson | G06F 12/0806 |
| 6,594,674 | B1 * | 7/2003 | Kaplan | G06F 17/30067 |
| 7,082,424 | B2 * | 7/2006 | Molnar | G06F 9/465 |
| 7,631,078 | B2 * | 12/2009 | Ackaouy | H04L 67/2852 |
| | | | | 707/999.01 |
| 7,653,699 | B1 * | 1/2010 | Colgrove | G06F 17/30067 |
| | | | | 709/213 |
| 7,809,848 | B1 | 10/2010 | McDougall et al. | |
| 8,429,341 | B2 * | 4/2013 | Kazar | G06F 17/30091 |
| | | | | 711/112 |
| 8,600,998 | B1 | 12/2013 | Chaudhary et al. | |
| 9,015,333 | B2 * | 4/2015 | Rao | H04L 67/1097 |
| | | | | 709/219 |
| 9,110,920 | B1 * | 8/2015 | Amegadzie | G06F 17/30238 |

(Continued)

FOREIGN PATENT DOCUMENTS

CN     101789976 A     7/2010

OTHER PUBLICATIONS

Ansel, et al., "Language-Independent Sandboxing of Just-in-Time Compilation and Self-Modifying Code," PLDI'11, Jun. 4-8, 2011, San Jose, California, 12 pages.

(Continued)

*Primary Examiner* — Miranda Le
(74) *Attorney, Agent, or Firm* — Conley Rose, P.C.

(57) ABSTRACT

A device comprises a receiver configured to receive a join-lookup remote procedural call (RPC) for a file, wherein the join-lookup RPC requests a join operation of sub-files associated with the file, and a transmitter configured to transmit the file in response to the Join-Lookup RPC. A distributed file system (DFS) client comprises a transmitter configured to transmit a join-lookup RPC for a file, wherein the join-lookup RPC requests a join operation of sub-files associated with the file, and a receiver configured to receive the file in response to the Join-Lookup RPC. A method comprises receiving a join-lookup RPC for a file, wherein the join-lookup RPC requests a join operation of sub-files associated with the file, and transmitting the file in response to the Join-Lookup RPC.

13 Claims, 7 Drawing Sheets

(56) References Cited

U.S. PATENT DOCUMENTS

| | | | | |
|---|---|---|---|---|
| 2010/0058016 | A1* | 3/2010 | Nikara | G06F 12/1027 |
| | | | | 711/163 |
| 2011/0302583 | A1 | 12/2011 | Abadi et al. | |
| 2013/0091203 | A1* | 4/2013 | Araki | G06F 15/16 |
| | | | | 709/203 |
| 2013/0218934 | A1* | 8/2013 | Lin | G06F 17/30194 |
| | | | | 707/828 |
| 2014/0215153 | A1* | 7/2014 | Kaga | G06F 3/0689 |
| | | | | 711/114 |
| 2014/0282501 | A1* | 9/2014 | Zeng | G06F 9/45545 |
| | | | | 718/1 |

OTHER PUBLICATIONS

Donovan, et al., "PNaCI: Portable Native Client Executables," White Paper, Feb. 22, 2010, 6 pages.

"Mirage OS, Documentation and Guides," http://openmirage.org/wiki/overview-of-mirage, downloaded from the Internet Feb. 20, 2014, 4 pages.

Shepler, Ed., et al., "Network File System (NFS) Version 4 Minor Version 1 Protocol," RFC 5661, Jan. 2010, 617 pages.

Sehr, et al., "Adapting Software Fault Isolation to Contemporary CPU Architectures," 19th USENIX Security Symposium, http://www.usenix.org/events/sec0/index.html, Aug. 2010, 11 pages.

Yee, et al., "Native Client: A Sandbox for Portable, Untrusted x86 Native Code," 2009 IEEE Symposium on Security and Privacy, http://oakland09.cs.virginia.edu, May 2009, 15 pages.

"ZeroVM," ZeroVM sponsored by Rackspace, http://www.zerovm.org/architecture.htm, downloaded from the Internet Feb. 20, 2014, 2 pages.

Foreign Communication From A Counterpart Application, PCT Application No. PCT/CN2015/073117, International Search Report dated May 29, 2015, 7 pages.

Foreign Communication From A Counterpart Application, PCT Application No. PCT/CN2015/073117, Written Opinion dated May 29, 2015, 5 pages.

Foreign Communication From A Counterpart Application, European Application No. 15752348.1, Extended European Search Report dated Jan. 17, 2017, 8 pages.

* cited by examiner

FILE JOINING ON BACK END DEVICE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A distributed file system (DFS) is a file system that allows access to files from multiple devices. The DFS may employ a server-client architecture where clients may access files stored on central servers. Authorization rights may determine the extent, if any, of such access. The servers may be powerful computers dedicated to managing disk drives and may be collectively referred to as the back end of the DFS, and the clients may be personal computers and may be collectively referred to as the front end of the DFS. The servers may comprise, or be communicatively coupled to, system disk arrays. The system disk arrays may each comprise multiple system disks. Users may operate the clients using software applications. The DFS may use a uniform naming convention and mapping scheme to keep track of file locations. One advantage of DFSs is that they provide a centralized storage system on the servers, which may free resources on the clients that the clients would otherwise use to store files. The freed resources may thus allow the clients to perform other important functions.

Network File System (NFS) is a DFS protocol used to allow a client to access files on servers. NFS version 4.1 is the latest version of NFS and is incorporated by reference in its entirety. NFS and other DFS protocols may comprise remote procedural calls (RPCs), which may refer to communications that allow one device to cause a procedure to execute on another device without explicit user interaction. Typical RPCs may be read, write, remove, and read a directory (e.g., readdir). RPCs are invoked with reference to an opaque file handle and input parameters, or call arguments. NFS was previously a stateless protocol, meaning that it treated each request for data as an independent request unrelated to any previous request. NFS has, however, evolved to a stateful protocol, meaning that related requests are treated as such. The evolution to a stateful protocol has improved performance of DFSs for wide area networks (WANs), but as file sizes increase and DFSs become more complicated, it is becoming more important to further optimize file distribution in DFSs.

SUMMARY

In one embodiment, the disclosure includes a device comprising a receiver configured to receive a join-lookup RPC for a file, wherein the join-lookup RPC requests a join operation of sub-files associated with the file, and a transmitter configured to transmit the file in response to the Join-Lookup RPC.

In another embodiment, the disclosure includes a DFS client comprising a transmitter configured to transmit a join-lookup RPC for a file, wherein the join-lookup RPC requests a join operation of sub-files associated with the file, and a receiver configured to receive the file in response to the Join-Lookup RPC.

In yet another embodiment, the disclosure includes a method comprising receiving a join-lookup RPC for a file, wherein the join-lookup RPC requests a join operation of sub-files associated with the file, and transmitting the file in response to the Join-Lookup RPC.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
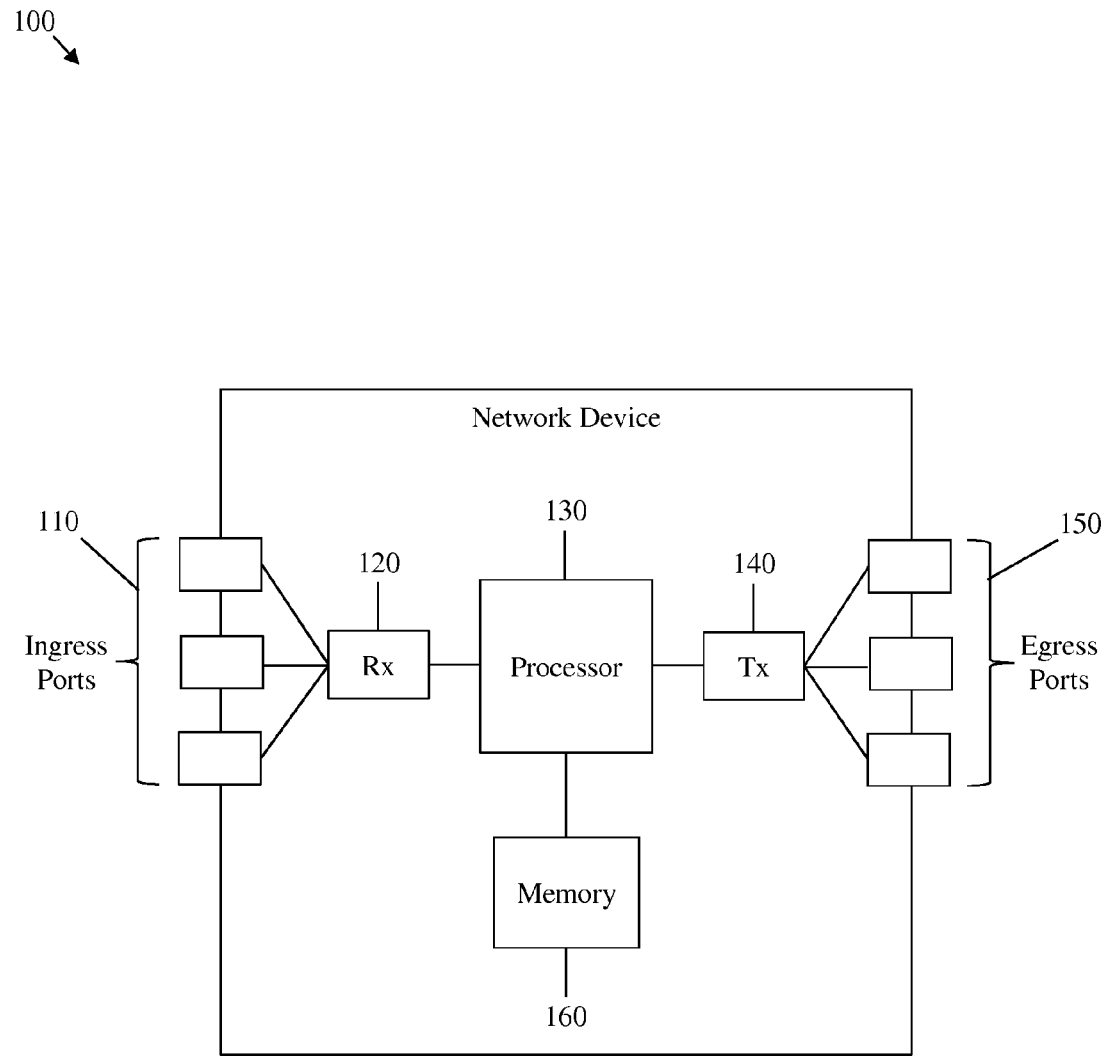
FIG. 1 is a schematic diagram of a network device according to an embodiment of the disclosure.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

When a client in a DFS requests data associated with a file, a responding server may have to retrieve that data from multiple files, or sub-files, residing on multiple system disks. For example, a typical LAMP-based web application may cause a user's statistical data to collect over a period of time. LAMP may refer to Linux; Apache; MySQL; and PHP, Perl or Python. Linux is an operating system; Apache is a web server software program; MySQL is database software; and PHP, Perl, and Python are programming languages. The data may be located in different sub-files located on different system disks. In that case, the application may need to combine the sub-files into the file in order for the data to be usable. Accordingly, the client may interact with the server via a series of RPCs for each sub-file on each system disk. For instance, if the server has to retrieve data from five sub-files where each sub-file resides on a different system disk, then the client may interact with the server via five series of RPCs. After all of the series of RPCs, the client may join the data in a logical manner. That joining process may be referred to as a join operation. The multiple series of RPCs may result in significant overhead, though, particularly if the amount of data is large. Accordingly, there is a need to reduce that overhead in order to reduce the latency of the join operation, and there is a need to do so in a scalable and secure fashion.

Disclosed herein are techniques, methods, and devices for an improved DFS. In particular, the disclosed technique may migrate the join operation from the client to the server. The join operation may be accomplished via the client sending a new join-lookup RPC to the server, the server executing the join-lookup and related join operation in its own sandbox, and a modification to an application programming interface (API) to include semantics for the join-lookup and related join operation. A sandbox may refer to a controlled process or set of resources on a specific space in a memory, in this case the server memory. A sandbox may also be referred to as a container or a virtual machine, which may refer to a software-based computer. An API may refer to a library that specifies how software components interact. By migrating the join operation from the client to the server, the disclosed technique may provide at least three benefits. First, the join-lookup may require only a single series of RPCs, as opposed to multiple series of RPCs, thus reducing overhead associated with a data request and thus reducing the latency of the join operation. As file sizes increase, traditional techniques may require even more series of RPCs, thus further highlighting the reduction in overhead appreciated by the disclosed technique. Second, the sandbox is highly scalable due its relatively small size. Third, the join operation is secure because it occurs in the sandbox, which is inherently secure.

FIG. 1 is a schematic diagram of a network device 100 according to an embodiment of the disclosure. The network device 100 may comprise a plurality of ingress ports 110 and/or receiver units (Rx) 120 for receiving data; a processor, logic unit, or central processing unit (CPU) 130 to process the data; a plurality of transmitter units (Tx) 140 and/or egress ports 150 for transmitting the data; and a memory 160 for storing the data. The network device 100 may be suitable for implementing any of the disclosed techniques, methods, and devices.

The processor 130 may be implemented by hardware and/or software. The processor 130 may be in communication with the ingress ports 110, receiver units 120, transmitter units 140, egress ports 150, and memory 160. The processor 130 may be implemented as one or more CPU chips, cores (e.g., as a multi-core processor), field-programmable gate arrays (FPGAs), application specific integrated circuits (ASICs), and/or digital signal processors (DSPs).

The memory 160 may comprise one or more disks, tape drives, or solid-state drives; may be used as an over-flow data storage device; may be used to store programs when such programs are selected for execution; and may be used to store instructions and data that are read during program execution. The memory 160 may be volatile and/or non-volatile and may be read-only memory (ROM), random-access memory (RAM), ternary content-addressable memory (TCAM), static random-access memory (SRAM), or any combination thereof.

Figure 2:
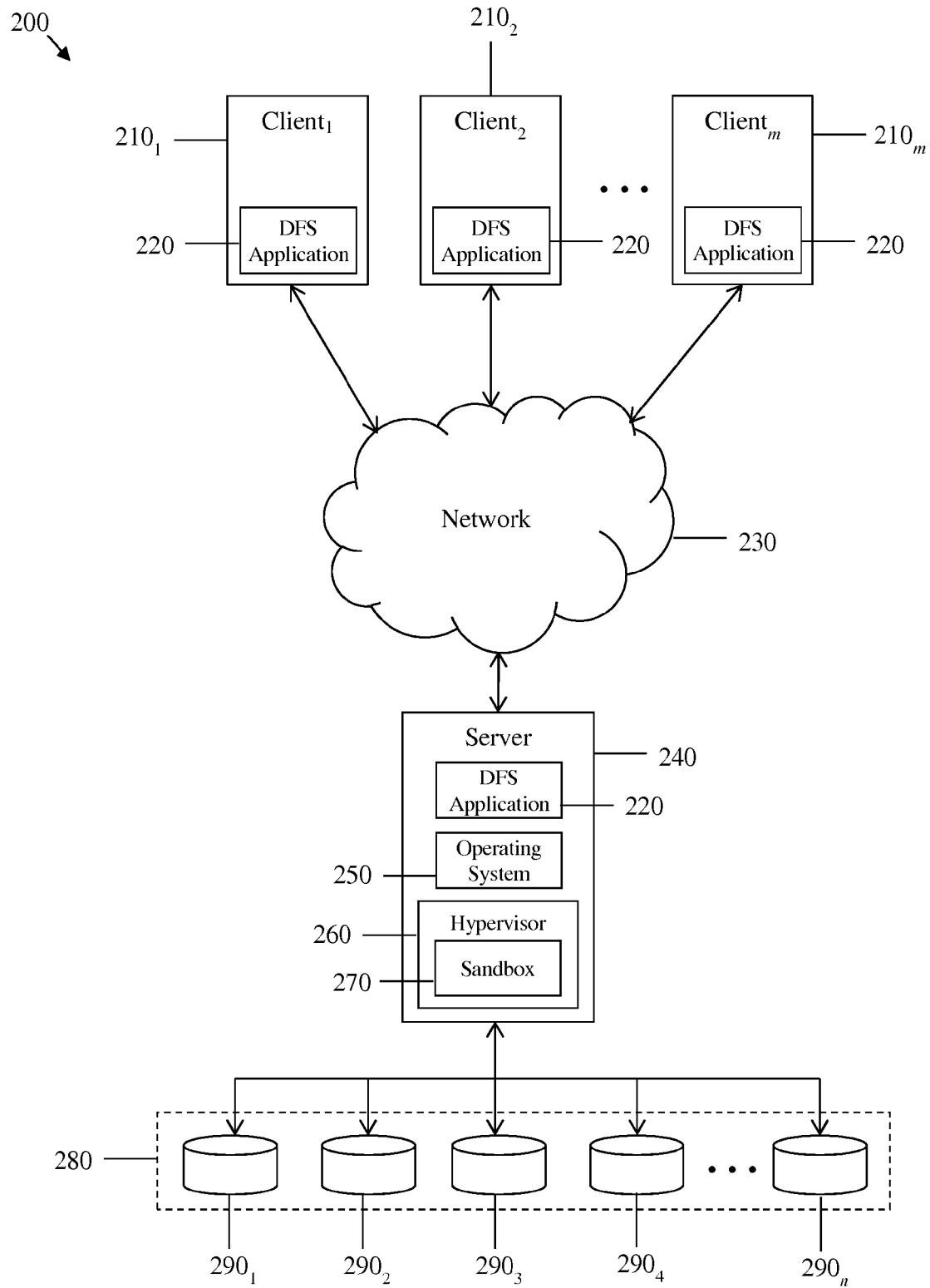
FIG. 2 is a schematic diagram of a DFS according to an embodiment of the disclosure.

FIG. 2 is a schematic diagram of a DFS 200 according to an embodiment of the disclosure. The DFS 200 may comprise m clients 210, a network 230, a server 240, and a system disk array 280. M may represent any suitable number. The DFS 200 components may be communicatively coupled to each other via any suitable wired or wireless channels. The DFS 200 components may communicate with each other using NFS or any other suitable protocol.

The clients 210 may be any hardware devices configured to send and receive data. The clients 210 may each comprise a DFS application 220. The clients 210 may be associated with end users. For example, the clients 210 may be notebook computers, tablet computers, desktop computers, mobile telephones, or other devices. Alternatively, the clients may be servers communicatively coupled to end user devices such as notebook computers, tablet computers, desktop computers, mobile telephones, or other devices. In that case, the clients 210 may be referred to as application servers.

The application 220 may be a database application or other application suitable for requesting and receiving data. For example, the application 220 may request and receive data via a series of RPCs using NFS or another suitable protocol. The application 220 may comprise, or be associated with, an API (not shown). The API may be modified to include semantics for the new join-lookup.

The network 230 may be any network configured to provide for communication among the DFS 200 components. For example, the network 230 may be the Internet, a mobile telephone network, a local area network (LAN), a wide area network (WAN), or another network. Alternatively, the network 230 may be a dedicated channel between the clients 210 and the server 240. The network 230 may allow communication along any suitable wired or wireless channels.

The server 240 may be any hardware device configured to send and receive data. For example, the server 240 may be an $EMC^2$, NetApp, PLX Technology, or similar server with any suitable amount of processing power and memory. The server 240 may comprise the application 220, an operating system 250, and a hypervisor 260. The server 240 may be a network-attached storage (NAS) device, which may refer to a file-level computer data storage device built specifically for storing and serving files. The server 240 may also be referred to as an NAS gateway device or NAS controller. The server 240 may be configured to perform tasks for the clients 210. For example, the server 240 may be a dedicated hardware computer server.

The operating system 250 may be any operating system configured to receive data requests from, and send data to, the clients 210. Before sending data to the clients 210, the operating system 250 may first retrieve that data from the system disk array 280. The server 240 may comprise, or be communicatively coupled to, the system disk array 280. The system disk array 280 may comprise n system disks 290 configured to store data for use by the server 240. N may represent any suitable number.

The hypervisor 260 may be software, firmware, or hardware that creates and runs virtual machines. In that respect, the hypervisor 260 may create and run a sandbox 270. In addition, the hypervisor 260 may control the use of CPU 130 time, the number of calls, memory allocation, and other system resources associated with the application 220. The hypervisor 260 may be a ZeroVM hypervisor, which is an open-source hypervisor described at www.zerovm.org and is incorporated by reference in its entirety.

The sandbox 270 may be a controlled process or set of resources as described above. There are at least two types of sandboxes. A first type of sandbox may comprise a grouping of multiple processes and may enforce process-level policies. A second type of sandbox may be library-based, or exokernel-based, and may enforce modified abstractions or APIs, for example, para-virtualized abstractions of sandboxing. For the second type of sandbox, the operating system 250 may be aware of an application executing in the sandbox. The sandbox 270 may be a library-based sandbox. The sandbox 270 may be said to be lightweight or have a low hypervisor footprint, meaning that the sandbox 270 may occupy a relatively small portion of the server's 240 memory. For example, the sandbox 270 may occupy up to only 75 kilobytes (kB) of server 240 memory. The sandbox 240 may be based on the Google Native Client sandbox technique, which is described at www.code.google.com/p/nativeclient/ and is incorporated by reference in its entirety. The application 220 may connect to the sandbox 270 for secured execution. To read a file, the client 210 may receive an input channel from a template manifest (not shown) provided by the hypervisor 260. To write to a file, the client 210 may receive an output channel from the manifest. The application 220 may receive or set variables in the manifest using a special call. The manifest may be configured dynamically based on file attributes, operation, and system resources.

Figure 3:
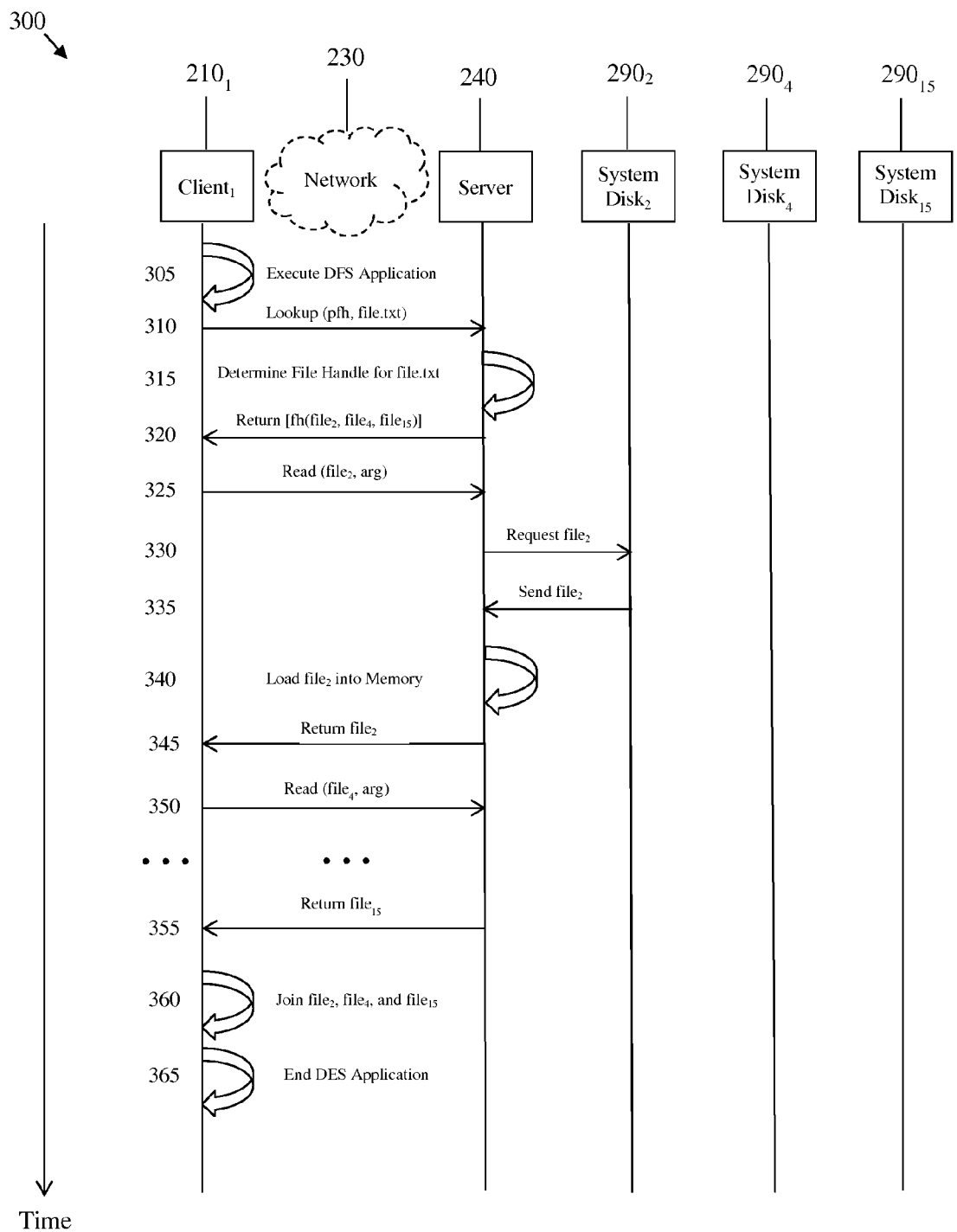
FIG. 3 is a message sequence diagram of the DFS described in FIG. 2 executing a join operation.

FIG. 3 is a message sequence diagram of the DFS 200 described in FIG. 2 executing a join operation. At step 305, the application 220 may execute on the $client_1$ $210_1$. For example, a user associated with the $client_1$ $210_1$ may run the application 220 and instruct it to download a file named "file.txt" from the server 240. Accordingly, the $client_1$ $210_1$ and the server 240 may begin a series of RPCs. At step 310, the $client_1$ $210_1$ may send to the server 240 a lookup. The lookup may be in the form of Lookup (pfh, arg). Pfh may refer to parent file handle, which may refer to the directory the lookup is performed in. A file handle may be a pointer to the file structure of a file to be downloaded. Arg may refer to call arguments and may comprise a file name parameter. The file name parameter may refer to the name of a file to be downloaded. Accordingly, the lookup may be Lookup (pfh, file.txt), which may instruct the server 240 to look up and return a file handle for file.txt. From an API perspective, the lookup may be associated with File Open, virtual file system (VFS) Lookup, and NFS Lookup layer operations on the $client_1$ $210_1$ side and the server 240 side. VFS Lookup may be at a layer lower than File Open, and NFS Lookup may be at a lower layer than VFS Lookup. Alternatively, File Open may be at the highest layer, VFS Lookup may be at a lower layer, and NFS Lookup may be at the lowest layer. At step 315, the server 240 may determine the file handle for file.txt. The file handle may not, however, be a single pointer for the entirety of file.txt. For example, NFS configuration, the size of file.txt, or the number of sub-files needed to create file.txt may require that the server 240 send file.txt in multiple sub-files. For example, the entirety of file.txt may not reside on a single system disk 290, but rather a first sub-file of file.txt may reside on the $system disk_2$ $290_2$, a second sub-file of file.txt may reside on the $system disk_4$ $290_4$, and a third sub-file of file.txt may reside on the $system disk_{15}$ $290_{15}$. The first sub-file of file.txt may be referred to as $file_2$, the second sub-file of file.txt may be referred to as $file_4$, and the third sub-file of file.txt may be referred to as $file_{15}$. In that case, the $client_1$ $210_1$ and the server 240 may execute a series of RPCs for each of the three sub-files of file.txt. At step 320, the server 240 may send to the $client_1$ $210_1$ a return. The return may be in the form of Return (fh). Fh may refer to file handle. Accordingly, fh may comprise pointers to $file_2$, $file_4$, and $file_{15}$.

At step 325, the $client_1$ $210_1$ may send to the server 240 a read. The read may be in the form of Read (fh, arg). Fh is described above. Arg is described above and may comprise a byte offset and byte count. Accordingly, the read may be Read [$file_2$, (200; 4,000)], which may instruct the server 240 to return $file_2$ at a byte offset of 200 and a byte count of 4,000. From an API perspective, the read may be associated with File Read, VFS Read, and NFS Read layer operations on the $client_1$ $210_1$ side and the server 240 side. VFS Ready may be at a lower layer than File Read, and NFS Read may be at a lower layer than VFS Read. Alternatively, File Read may be at the highest layer, VFS Read may be at a lower layer, and NFS Read may be at the lowest layer. At step 330, the server 240 may request $file_2$ from the $system disk_2$ $290_2$. At step 335, the $system disk_2$ $290_2$ may send $file_2$ to the server 240. At step 340, the server 240 may load into its memory $file_2$. At step 345, the server 240 may return $file_2$ to the $client_1$ $210_1$. At step 350, the $client_1$ may begin similar read and return processes for $file_4$ and $file_{15}$ until, at step 355, the server 240 returns $file_{15}$ to the $client_1$.

At step 360, the $client_1$ $210_1$ may perform a join operation and join $file_2$, $file_4$, and $file_{15}$ to form file.txt. Finally, at step 365, the $client_1$ $210_1$ may end the application 220. As can be seen, the join operation requires repetitive RPCs between the $client_1$ $210_1$ and the server 240. Specifically, each of $file_2$, $file_4$, and $file_{15}$ requires a set of read and return RPCs, thus totaling six RPCs. As requested data sizes increase, the server 240 may send that requested data in even more files, thus requiring even more series of RPCs. The multiple series of RPCs may result in significant overhead across the network 230 and thus the DFS 200.

Figure 4:
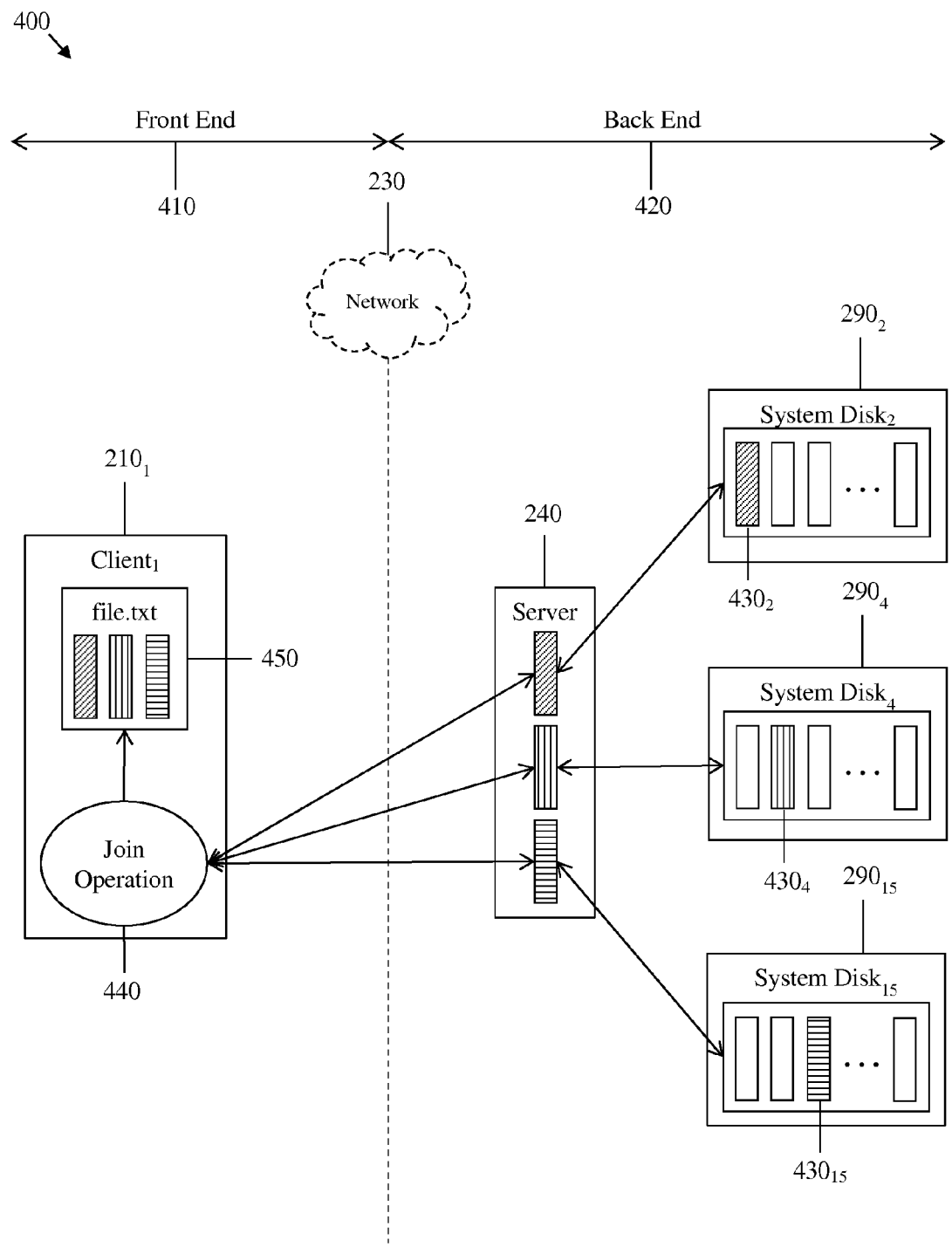
FIG. 4 is a graphical illustration of the join operation described in FIG. 3.

FIG. 4 is a graphical illustration of the join operation described in FIG. 3. The illustration may comprise the DFS 200, which may comprise a front end 410 comprising the $client 210_1$; the network 230; and a back end 420 comprising the server 240, $system disk_2$ $290_2$, $system disk_4$ $290_4$, and $system disk_{15}$ $290_{15}$. As shown, the server 240 may receive $file_2$ $430_2$ from the $system disk_2$ $290_2$, $file_4$ $430_4$ from the $system disk_4$ $290_4$, and $file_{15}$ $430_{15}$ from the $system disk_{15}$ $290_{15}$. The server 240 may then return $file_2$ $430_2$, $file_4$ $430_4$, and $file_{15}$ $430_{15}$ to the $client_1$ $210_1$. The $client_1$ $210_1$ may perform a join operation and join $file_2$ $430_2$, $file_4$ $430_4$, and $file_{15}$ $430_{15}$ to form file.txt 450, the complete file that the $client_1$ $210_1$ originally requested from the server 240. As also shown, the join operation 440 may occur on the front end 410 as opposed to the back end 420.

Figure 5:
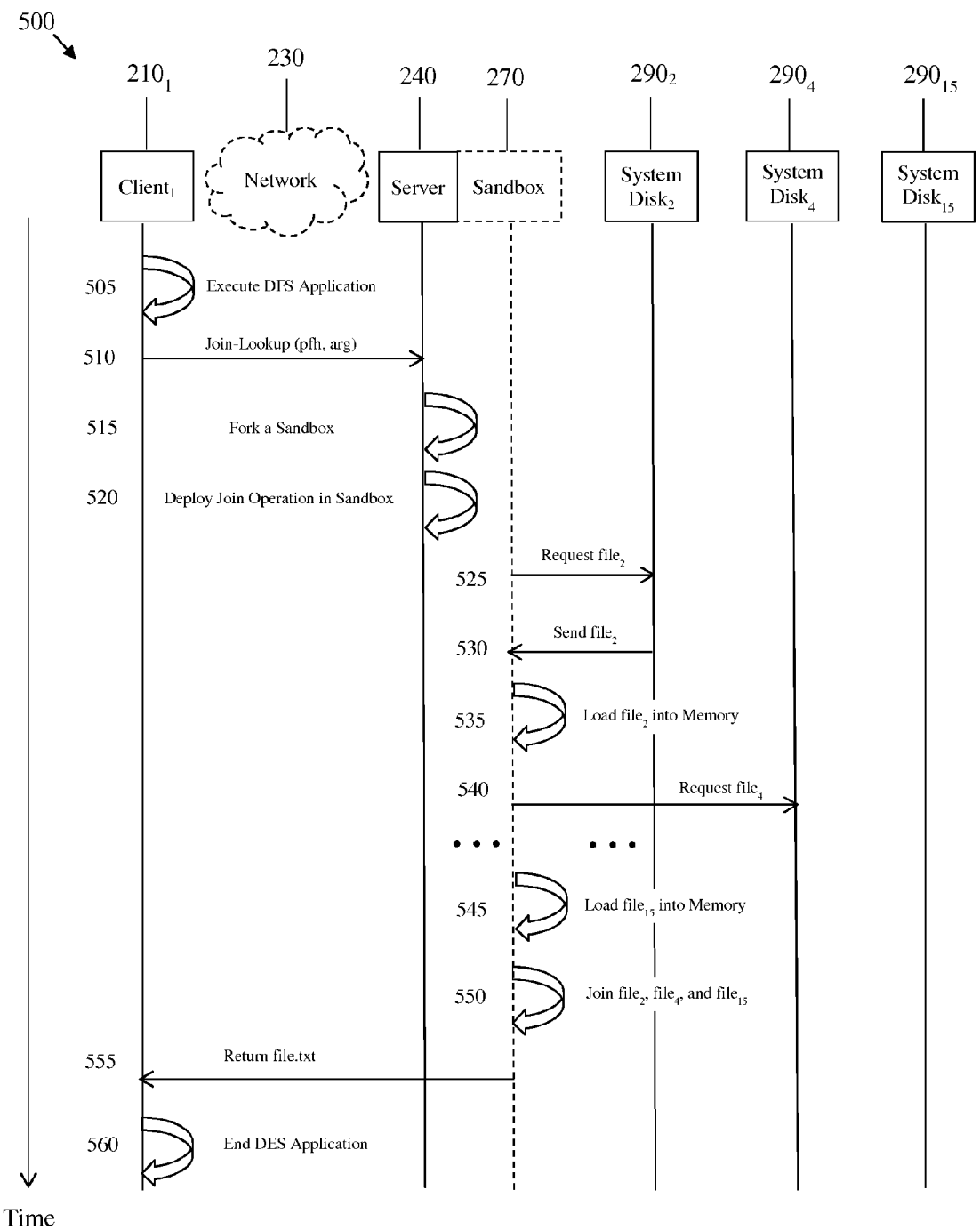
FIG. 5 is a message sequence diagram of the DFS described in FIG. 2 executing a join operation according to an embodiment of the disclosure.

FIG. 5 is a message sequence diagram of the DFS 200 described in FIG. 2 executing a join operation according to an embodiment of the disclosure. At step 505, the application 220 may execute on the $client_1$ $210_1$. For example, the user associated with the $client_1$ $210_1$ may run the application 220 and instruct it to download file.txt 450 from the server 240. Accordingly, the $client_1$ $210_1$ and the server 240 may begin a series of RPCs. At step 510, the $client_1$ $210_1$ may send to the server 240 a join-lookup. The join-lookup may be in the form of Join-Lookup (pfh, arg). Pfh is described above. Arg is described above and may comprise no_of_files, join_op_info, fname(no_of_files), and condition parameters. The no_of_files parameter may refer to the number of files to look up and join. For example, the $client_1$ $210_1$ may request a join-lookup for file.txt 450 and four other files. In that case, the no_of_files parameter would be five. The join_op_info parameter may refer to the type of join operation. For example, the join operation may be an inner, outer, left, or right join. The fname(no_of_files) parameter may refer to the names of the files to look up and join. For example, the fname(no_of_files) parameter may comprise file.txt 450 and the names of the other four files in the example above. Finally, the condition parameter may refer to offset or other related information. For example, the condition parameter may specify that the join operation should be an equal or a natural join operation. Arg may be in the following form:

```
Struct join_arg {
    Int no_of_files;
    String join_op_info;
    String fnam(no_of_files);
    Int condition;
}.
```

Accordingly, the join-lookup may be Join-Lookup [pfh, (1,*, file.txt,*)], which may instruct the server 240 to look up, join, and return file.txt 450. The * symbols may indicate that the remaining arguments may be any suitable values. From an API perspective, the join-lookup may be associated with File COpen, which may be a modified file open; VFS Join-Lookup; and NFS Join-Lookup layer operations on the $client_1$ $210_1$ side and the server 240 side. VFS Join-Lookup may be at a lower layer than File COpen, and NFS Join-Lookup may be at a lower layer than VFS Join-Lookup. Alternatively, File COpen may be at the highest layer, VFS Join-Lookup may be at a lower layer, and NFS Join-Lookup may be at the lowest layer.

At step 515, the server 240 may fork the sandbox 270 via the hypervisor 260. Forking may refer to creating a byte stream associated with a file system object, in this case the sandbox 270. At step 520, the server 240 may deploy the join operation in the sandbox 270. Accordingly, the sandbox 270 may begin the process of requesting and receiving the sub-files that comprise file.txt 450. At step 525, the sandbox 270 may request $file_2$ $430_2$ from the $system disk_2$ $290_2$. At step 530, the $system disk_2$ $290_2$ may send $file_2$ $430_2$ to the sandbox 270. At step 535, the sandbox 270 may load into its memory $file_2$ $430_2$. At step 540, the sandbox 270 may begin similar request, send, and load processes for $file_4$ $430_4$ and $file_{15}$ $430_{15}$ until, at step 545, the sandbox 270 loads into its memory $file_{15}$ $430_{15}$.

At step 550, the sandbox 270 may perform a join operation and join $file_2$ $430_2$, $file_4$ $430_4$, and $file_{15}$ $430_{15}$ to form file.txt 450. At step 555, the sandbox 270 may return file.txt 450 to the $client_1$ $210_1$. Finally, at step 560, the $client_1$ $210_1$ may end the application 220. As can be seen, the join operation does not require repetitive RPCs between the $client_1$ $210_1$ and the server 240. Rather, for $file_2$ $430_2$, $file_4$ $430_4$, and $file_{15}$ $430_{15}$, there may be only one series of join-lookup and return RPCs, thus totaling two RPCs.

Figure 6:
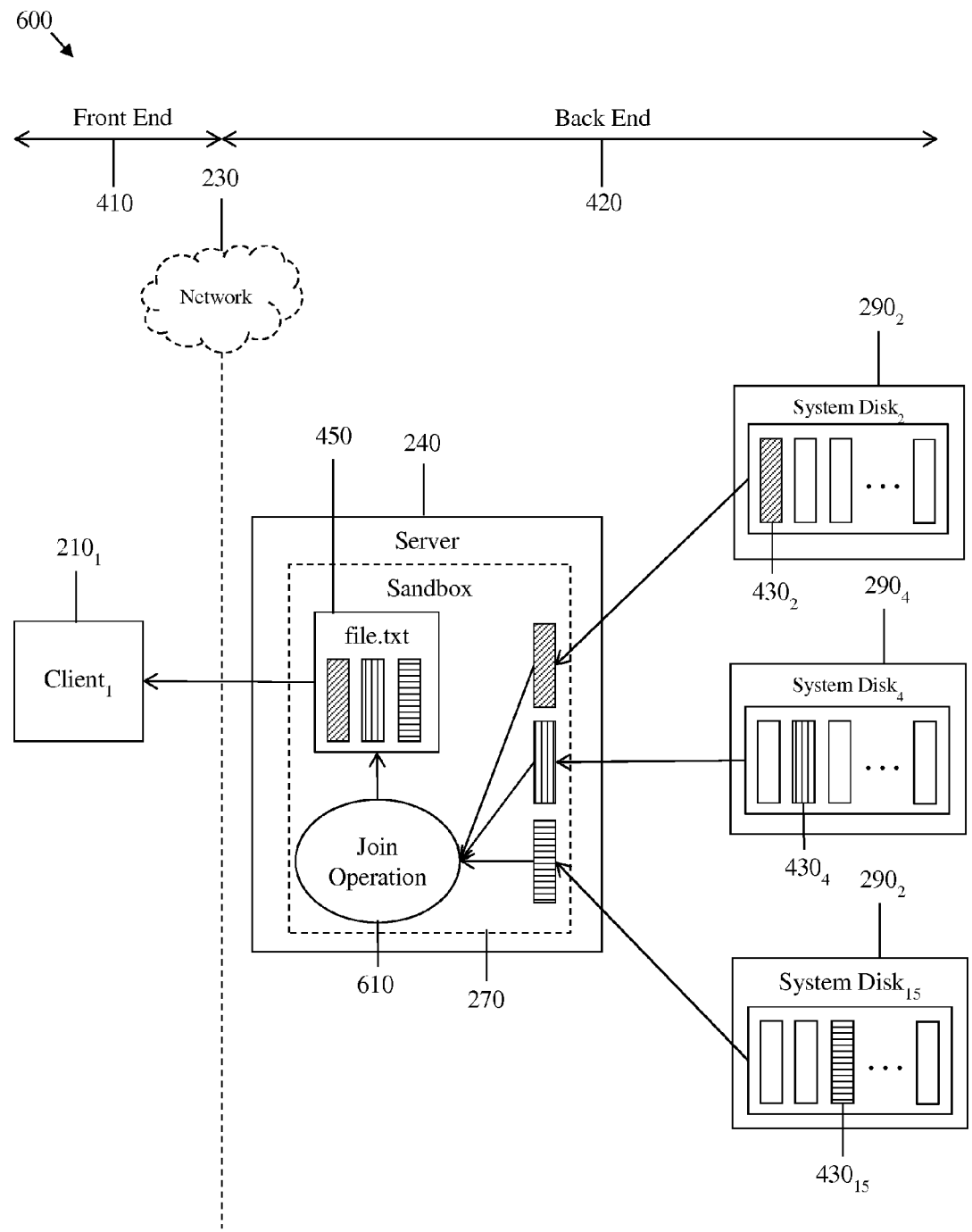
FIG. 6 is a graphical illustration of the join operation described in FIG. 5.

FIG. 6 is a graphical illustration of the join operation described in FIG. 5. The illustration may comprise the DFS 200, which may comprise the front end 410 comprising the client $210_1$; the network 230; and the back end 420 comprising the server 240, $system disk_2$ $290_2$, $system disk_4$ $290_4$, and $system disk_{15}$ $290_{15}$. As shown, the sandbox 270 may receive $file_2$ $430_2$ from the $system disk_2$ $290_2$, $file_4$ $430_4$ from the $system disk_4$ $290_4$, and $file_{15}$ $430_{15}$ from the $system disk_{15}$ $290_{15}$. The sandbox 270 may perform a join operation 610 and join $file_2$ $430_2$, $file_4$ $430_4$, and $file_{15}$ $430_{15}$ to form file.txt 450, the complete file that the $client_1$ $210_1$ originally requested from the server 240. The sandbox 270 may then return file.txt 450 to the $client_1$ $210_1$. As also shown, the join operation 610 may occur on the back end 420 as opposed to the front end 410.

Figure 7:
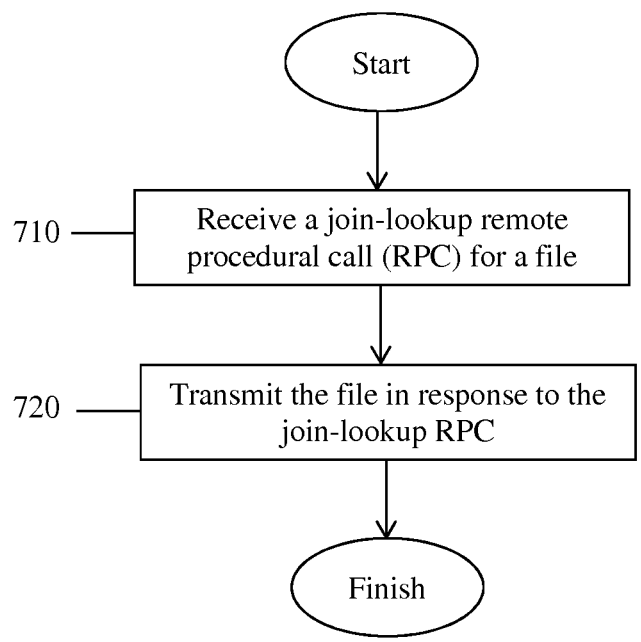
FIG. 7 is a flowchart illustrating a method of executing a join operation according to an embodiment of the disclosure.

FIG. 7 is a flowchart illustrating a method 700 of executing a join operation according to an embodiment of the disclosure. The method 700 may be implemented in the device 100, the server 240, or any other suitable device. At step 710, a join-lookup RPC for a file may be received. The join-lookup RPC may request a join operation of sub-files associated with the file. For example, the server 240 may receive the join-lookup from any of the clients 210. The join-lookup RPC may be in the form of Join-Lookup (pfh, arg). Step 710 may be similar to step 510 in FIG. 5. At step 720, the file may be transmitted in response to the join-lookup RPC. For example, the server 240 may send the file to any one of the clients 210. Step 720 may be similar to step 555 in FIG. 5.

The disclosed technique may be applicable to existing and future NFS and other DFS protocols, whether or not those protocols are stateless or stateful. In that respect, the disclosed technique may vary depending on the applicable protocol. Furthermore, the disclosed technique may be applicable to clustered file systems such as Hadoop distributed file systems (HDFSs) and Google File Systems (GFSs). Finally, the disclosed technique may employ alternate hypervisors such as Mirage, which is described at www.openmirage.org/ and is incorporated by reference in its entirety.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A device comprising:
   a receiver configured to receive a join-lookup remote procedural call (RPC) for a file, wherein the join-lookup RPC requests a join operation of sub-files associated with the file, wherein the join-lookup RPC comprises arguments, wherein the arguments comprise a first parameter referring to a number of files to look up and join, a second parameter referring to a type of join operation to perform, a third parameter referring to names of the files to look up and join, and a fourth parameter referring to offset or other related information, wherein the join-lookup RPC is associated with a modified file open layer operation, a virtual file system (VFS) join-lookup layer operation, and a Network File System (NFS) join-lookup layer operation, wherein the VFS join-lookup layer operation is at a lower layer than the modified file open layer operation, and wherein the NFS join-lookup layer operation is at a lower layer than the VFS join-lookup layer operation;
   a transmitter configured to transmit the file in response to the Join-Lookup RPC;
   a memory;
   a sandbox associated with a portion of the memory and configured to:
      retrieve the sub-files from system disks,
      load the sub-files, and
      perform the join operation, wherein the device is a distributed file system (DFS) network-attached storage (NAS) server configured to implement an NFS protocol; and
   a hypervisor configured to create and run the sandbox.

2. The device of claim 1, further comprising a system disk array, wherein the system disk array comprises the system disks, wherein the system disks comprise the sub-files.

3. The device of claim 1, wherein the sandbox is 75 kilobytes (kB) or less.

4. The device of claim 1, wherein the join-lookup RPC is in the form of Join-Lookup (pfh, arg), wherein pfh refers to a parent file handle, and wherein arg refers to the arguments.

5. The device of claim 1, wherein the arguments are in the following form:

```
Struct join_arg {
    Int no_of_files;
    String join_op_info;
    String fnam(no_of_files);
    Int condition;
}.
```

6. The device of claim 1, wherein the file is a text file.

7. The device of claim 1, wherein the file comprises a user's statistical data.

8. A distributed file system (DFS) client comprising:
   a memory;
   a processor coupled to the memory;
   a transmitter configured to transmit a join-lookup remote procedural call (RPC) for a file, wherein the join-lookup RPC requests a join operation of sub-files associated with the file, wherein the join-lookup RPC is associated with a modified file open layer operation, a virtual file system (VFS) join-lookup layer operation, and a Network File System (NFS) join-lookup layer operation, wherein the VFS join-lookup layer operation is at a lower layer than the modified file open layer operation, and wherein the NFS join-lookup layer operation is at a lower layer than the VFS join-lookup layer operation;
   an application programming interface (API) associated with an application, wherein the API comprises semantics for the join-lookup RPC; and
   a receiver configured to receive, from a distributed file system (DFS) network-attached storage (NAS) server configured to implement an NFS protocol, the file in response to the Join-Lookup RPC,
   wherein the join-lookup RPC comprises arguments, and
   wherein the arguments comprise a first parameter referring to a number of files to look up and join, a second parameter referring to a type of join operation to perform, a third parameter referring to names of the files to look up and join, and a fourth parameter referring to offset or other related information.

9. The DFS client of claim 8, wherein the application is stored on the memory, executed by the processor, and configured to implement the NFS protocol.

10. A method comprising:
    receiving a join-lookup remote procedural call (RPC) for a file, wherein the join-lookup RPC requests a join operation of sub-files associated with the file, wherein the join-lookup RPC comprises arguments, wherein the arguments comprise a first parameter referring to a number of files to look up and join, a second parameter referring to a type of join operation to perform, a third parameter referring to names of the files to look up and join, and a fourth parameter referring to offset or other related information, wherein the join-lookup RPC is associated with a modified file open layer operation, a virtual file system (VFS) join-lookup layer operation, and a Network File System (NFS) join-lookup layer operation, wherein the VFS join-lookup layer operation is at a lower layer than the modified file open layer operation, and wherein the NFS join-lookup layer operation is at a lower layer than the VFS join-lookup layer operation;
    transmitting, by a distributed file system (DFS) network-attached storage (NAS) server configured to implement an NFS protocol, the file in response to the Join-Lookup RPC;
    creating and running a sandbox by a hypervisor;

retrieving the sub-files by the sandbox and from system disks;

loading the sub-files into the sandbox; and performing the join operation in the sandbox.

11. The method of claim 10, wherein the sandbox is 75 kilobytes (kB) or less.

12. The method of claim 10, wherein the join-lookup RPC is in the form of Join-Lookup (pfh, arg), wherein pfh refers to a parent file handle, and wherein arg refers to the arguments.

13. The method of claim 10, wherein the arguments are in the following form:

```
Struct join_arg {
    Int no_of_files;
    String join_op_info;
    String fnam(no_of_files);
    Int condition;
}.
```

* * * * *